United States Patent [19]

Klosterhaus

[11] Patent Number: 4,953,653
[45] Date of Patent: Sep. 4, 1990

[54] FLUID POWER ASSIST RACK AND PINION STEERING GEAR WITH END-TAKE-OFF

[75] Inventor: Edwin G. Klosterhaus, Livonia, Mich.

[73] Assignee: TRW Inc., Lyndhurst, Ohio

[21] Appl. No.: 297,761

[22] Filed: Jan. 17, 1989

[51] Int. Cl.⁵ .................................................. B62D 5/06
[52] U.S. Cl. ..................................... 180/148; 180/140; 180/154
[58] Field of Search ................. 180/79, 132, 140, 148, 180/154, 158, 160, 162; 92/136

[56] References Cited

U.S. PATENT DOCUMENTS

| | | | |
|---|---|---|---|
| 3,605,933 | 9/1971 | Millard | 180/79 |
| 3,814,202 | 6/1974 | Rushton et al. | 180/148 X |
| 4,211,152 | 7/1980 | Colletti et al. | 92/168 |
| 4,599,911 | 7/1986 | Rosell | 180/148 X |
| 4,608,876 | 9/1986 | Rosell | 180/148 X |
| 4,629,026 | 12/1986 | Rosell | 180/148 |
| 4,702,333 | 10/1987 | Lippert | 180/140 |

FOREIGN PATENT DOCUMENTS 0076394 4/1983 European Pat. Off. .
1275617 5/1972 United Kingdom .
1289861 9/1972 United Kingdom .
1387176 3/1975 United Kingdom .

OTHER PUBLICATIONS

British Search Report dated 10/31/69.

Primary Examiner—Charles A. Marmor
Assistant Examiner—Brian L. Johnson
Attorney, Agent, or Firm—Tarolli, Sundheim & Covell

[57] ABSTRACT

A fluid power assist steering gear for steering a pair of steerable wheels of a vehicle includes a rack housing. A rack member is supported for axial movement in the rack housing. The rack member is connectable at axially opposite ends with a pair of tie rods associated with the steerable wheels of the vehicle. A plurality of rack teeth are formed on the rack member. A rotatable pinion gear is in meshing engagement with the rack teeth on the rack member. A fluid motor moves the rack member to provide steering power assist. The fluid motor comprises a piston fixed to the housing. First and second members are fixed to the rack member on the sides of the piston. The first and second members are movable with the rack member when pressurized fluid is directed into a space between the piston and one of the first and second members.

3 Claims, 3 Drawing Sheets

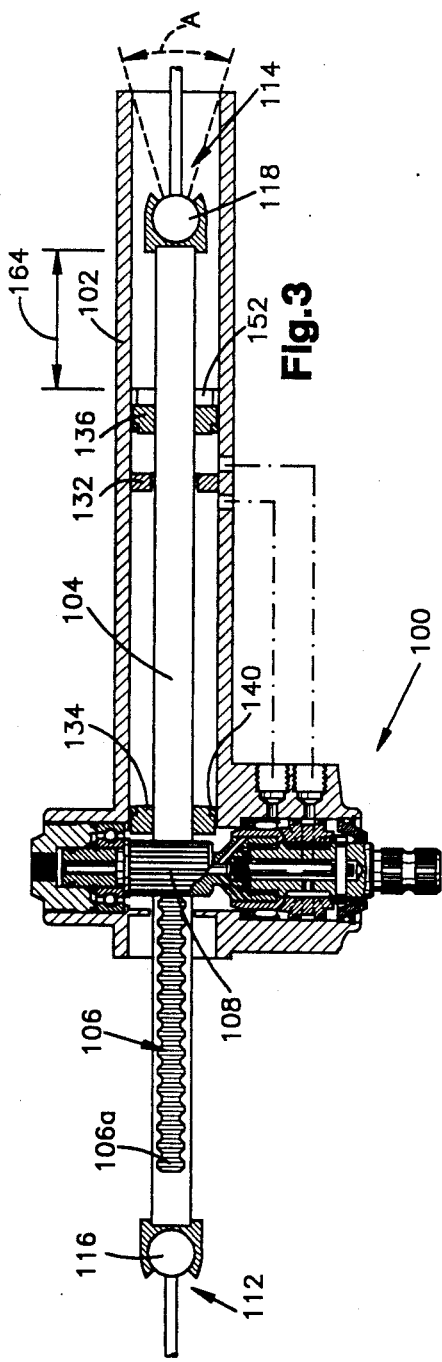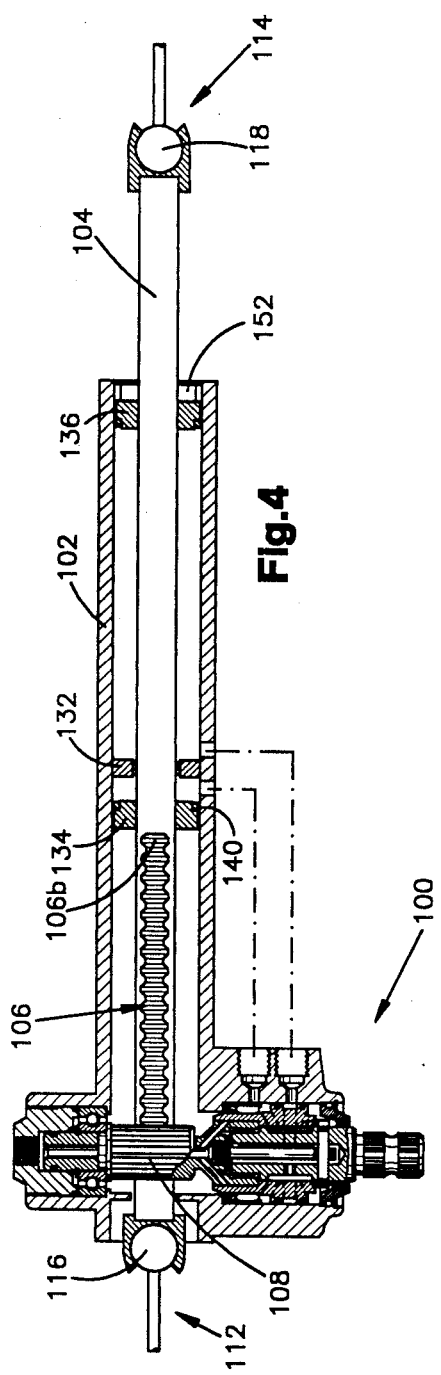

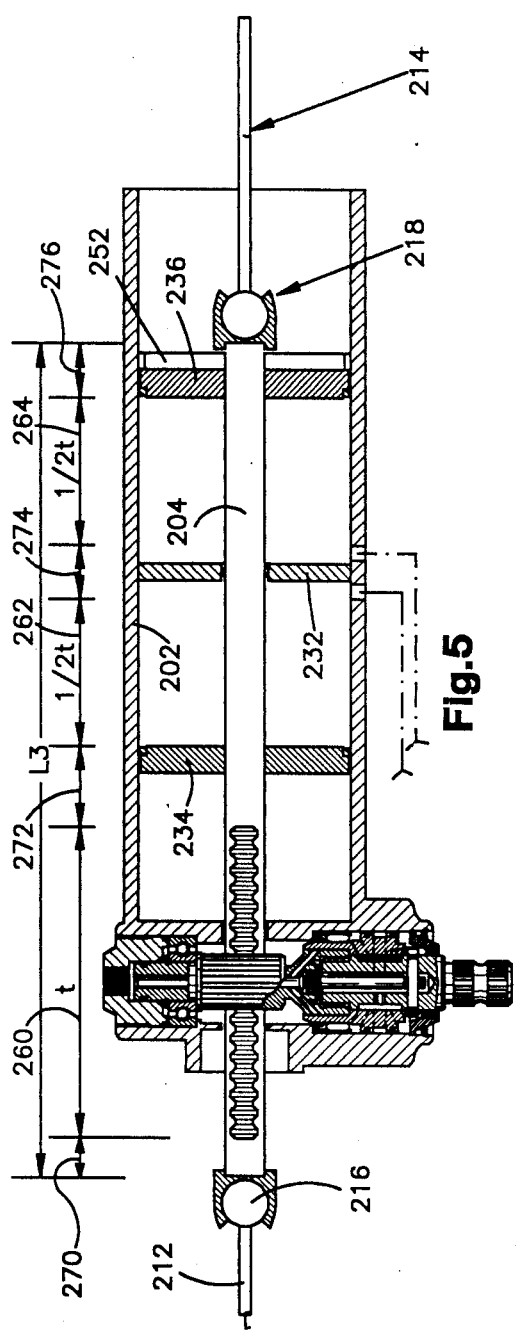
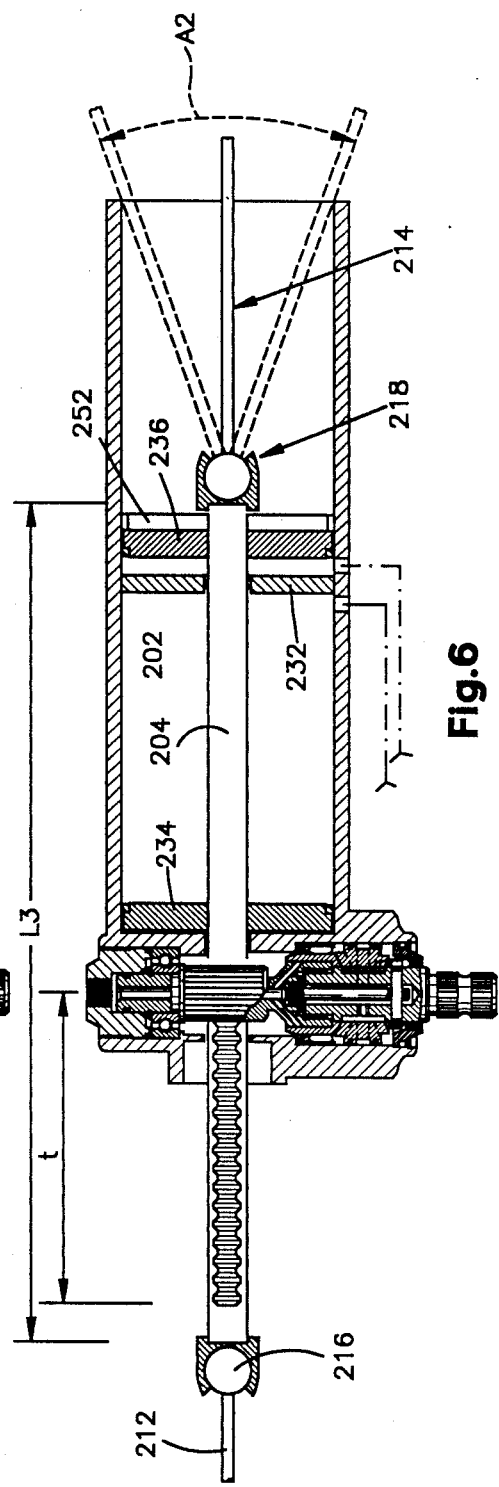

FLUID POWER ASSIST RACK AND PINION STEERING GEAR WITH END-TAKE-OFF

BACKGROUND OF THE INVENTION

1. Technical Field

The present invention relates to a vehicle steering gear and, particularly, to a fluid power assist rack and pinion steering gear with end-take-off.

2. Description of the Prior Art

Fluid power assist rack and pinion steering gears with end-take-off for vehicles are known. U.S. Pat. No. 4,211,152 discloses such a steering gear. The steering gear of U.S. Pat. No. 4,211,152 includes a rack housing for attachment to a vehicle. A rack member is supported in the housing for axial movement relative to the rack housing. Axially opposite ends of the rack member are connected to a respective ball and socket joint of respective tie rods which are associated with the steerable wheels of the vehicle. Rack teeth are formed on the rack member adjacent one of its axial ends. A rotatable pinion gear is in meshing engagement with the rack teeth. A fluid motor is associated with the rack member to provide a power assist toward movement. The fluid motor includes a piston fixed to the rack member, located in a fluid chamber of the fluid motor, and movable with the rack member. The piston is located between end walls of the fluid chamber and divides the fluid chamber into a pair of power assist fluid working chambers.

The rack member is movable from an initial position in opposite directions. A rack tooth at one end of the rack is spaced apart from a rack tooth at the other end of the rack a distance which defines a length of travel of the rack member. Seals are located in the opposite end walls of the fluid motor. The end walls of the fluid motor are spaced apart at least a distance equal to the length of travel of the rack member. The seals tightly encircle the periphery of the rack member to prevent fluid leakage from the working chambers.

The rack member has a relatively smooth surface adjacent the rack teeth for a length approximately one-half the length of travel of the rack member. The smooth surface spaces the rack teeth from one of the seals so the rack teeth cannot move to a position within the seal which could create fluid leakage. In its initial position, the piston is located a distance at least one-half the length of travel of the rack member from either end wall of the fluid chamber. The distance that the rack member extends axially outward of the rack housing must be at least equal to one-half the length of travel of the rack member so the ball and socket joints of the tie rods do not engage end walls of the housing.

The overall length of the rack member is defined as the sum of the lengths of portions of the rack member which are required to accommodate travel of the rack member plus the sum of the lengths of the piston, chamber end walls, bearing and spacing of the ball and socket joints along the rack member. The sum of the lengths of the portions of the rack member required to accommodate travel of the rack member must be at least three times the length of travel of the rack member. The exact length of travel of the rack member, and thus the overall length of the rack member, is dependent upon the requirements of the particular vehicle in which the steering gear is used.

Such a steering gear has a relatively long rack member. Thus, the steering gear occupies valuable space in the vehicle. It should be apparent that it is desirable to decrease the length of the rack to thereby decrease the amount of space required to package a steering gear in a vehicle, to reduce weight in the vehicle, and to provide for optimized vehicle steering characteristics which may require shorter rack lengths than are available from prior art end-take-off steering gears.

SUMMARY OF THE INVENTION

The present invention provides a fluid power assist rack and pinion steering gear with end-take-off for steering a pair of steerable wheels of a vehicle. The steering gear includes a rack member of a relatively short length. Thus, the steering gear of the present invention has the advantage of being relatively compact in size and relatively light in weight.

The steering gear embodying the present invention includes a rack housing which is attachable to a vehicle. A rack member is movable in the housing and has axially opposite ends which are connectable with ball and socket joints of a pair of tie rods. The tie rods are associated with the steerable wheels of the vehicle. A plurality of rack teeth are formed on the rack member. A rotatable pinion gear is in meshing engagement with the rack teeth on the rack member. A fluid motor moves the rack member to provide steering power assist. The fluid motor is located completely within the axial extent of the rack member. The fluid motor includes a piston fixed to the housing. First and second end wall members are fixed to the rack member on opposite sides of the piston. The first and second end wall members are movable with the rack member when pressurized fluid is directed into a space between the piston and one of the first and second end wall members.

The rack member is reciprocably movable in a path between end limits which are spaced a predetermined distance apart. The rack member has an overall length defined by the sum of the lengths of portions of the rack member which are required to accommodate travel of the rack member plus the sum of the lengths of the piston, chamber end walls, bearing and spacing of the ball and socket joints along the rack member. The sum of the lengths of the portions of the rack member required to accommodate rack travel is less than three times the predetermined distance between the end limits of the path of movement of the rack member.

One of the first and second end wall members is fixed to the rack member at a location adjacent the rack teeth. A bearing is fixed to the rack member at a location adjacent the other of the first and second end wall members. The bearing is movable with the rack member to support the rack member for movement relative to the housing. One of the ball and socket joints is connectable to the rack member axially outward of the bearing. The ball and socket joint is movable within the housing during movement of the rack member. The ball and socket joint is spaced from the bearing a distance sufficient, for a given inner diameter of the housing, to provide tie rod articulation necessary for the particular vehicle application.

In an alternate embodiment of the present invention, one of the ball and socket joints is connectable to the rack member adjacent the bearing. Tie rod articulation necessary for the particular vehicle application is provided by selecting the inner diameter of the housing to be sufficient to clear the maximum articulation of the tie rod, when the rack member is positioned at a travel limit with the ball and socket joint within the housing. Such an inner diameter of the housing can be selected independent of rack travel or axial design constraints on the steering gear. The sum of the lengths of portions of the rack member required to accommodate travel of the rack member is two times the predetermined distance between end limits of the path of travel of the rack member.

BRIEF DESCRIPTION OF THE DRAWINGS

Further features of the present invention will become apparent to those skilled in the art to which the present invention relates from reading the following specification with reference to the accompanying drawings, in which:

FIGS. 3-4 are views, similar to FIG. 2, with parts in different positions;

FIG. 5 is a longitudinal cross-sectional view of another embodiment of a rack and pinion steering gear of the present invention; and FIG. 6 is a view, similar to FIG. 5, with parts in different positions.

DESCRIPTION OF PREFERRED EMBODIMENTS

Figure 1:
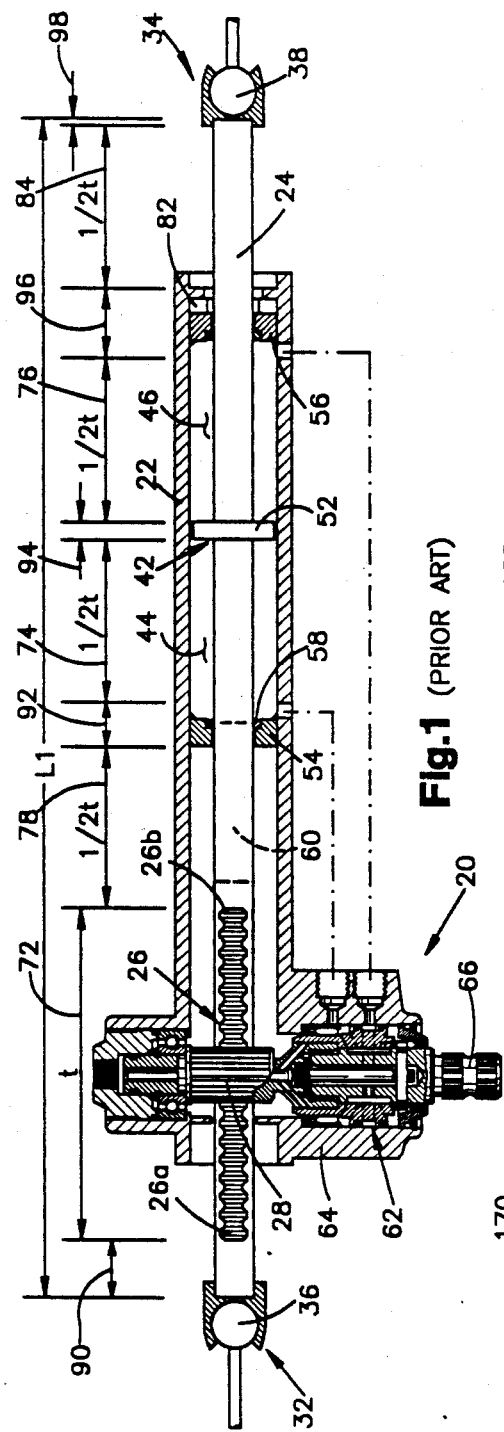
FIG. 1 is a longitudinal cross-sectional view of a prior art rack and pinion steering gear.

A known prior art steering gear 20 is illustrated in FIG. 1 for steering a pair of steerable wheels of a vehicle. The steering gear 20 includes a generally tubular rack housing 22 which is attachable to the vehicle. A rack member 24 is supported in the rack housing 22 and is axially movable relative to the rack housing in opposite directions equidistant from an initial centered position, as illustrated in FIG. 1. A plurality of rack teeth 26 are formed on the rack member 24. A pinion gear 28 is supported for rotation and meshingly engages with the rack teeth 26 on the rack member 24. A pair of tie rods 32, 34 have ball and socket joints 36, 38, respectively, which are connected to axially opposite ends of the rack member 24. The tie rods 32, 34 are connectable to respective steerable wheels (not shown) of the vehicle.

The steering gear 20 has a fluid motor 42 for providing power assisted steering. The fluid motor 42 includes a pair of variable volume working chambers 44, 46 which are separated by a piston 52 fixed to the rack member 24. The piston 52 is movable with the rack member 24. A pair of end walls 54, 56 are fixed to the interior of the rack housing 22. When pressurized fluid is directed into one of the working chambers 44 or 46, the fluid acts against the piston 52 to expand the working chamber The piston and rack member 24 move relative to the rack housing 22 in a predetermined direction and for a predetermined distance.

A control valve 62 is supported in a housing 64. Upon actuation, the control valve 62 directs fluid flow to a respective one of the working chambers 44, 46. The control valve 62 is actuated in response to relative rotation between the pinion gear 28 and an input shaft 66 which is connectable with the steering wheel (not shown) of the vehicle.

The rack member 24 is movable equidistant in either direction from an initial centered position, as illustrated in FIG. 1, to steer the steerable wheels of the vehicle. A rack tooth 26a at the left end of the rack is spaced from a rack tooth 26b at the right end of the rack. The distance 72 between the end rack teeth 26a, 26b establishes the maximum length of travel t that the rack member 24 may traverse. When the rack member 24 is in its initial centered position in which the steerable wheels are substantially straight-ahead, the piston 52 is located a distance 74, 76 slightly greater than one-half the length of travel t of the rack member away from each of the end walls 54, 56, respectively.

The left end wall 54 has an annular recess which receives a seal 58. The seal 58 tightly encircles the outer periphery of a smooth portion 60 of the rack member 24 as it moves through the left end wall 54. In order to maintain the fluid seal, the end rack tooth 26b must not extend to the right of the seal 58, as viewed in FIG. 1, when the rack member 24 is moved to its right travel limit. Thus, the end rack tooth 26b is spaced from the seal 58 a distance 78 at least one-half of the length of travel t of the rack member 24.

The ball and socket joint 38 of tie rod 34 is spaced from the right surface of a bearing 82 which is fixed to the rack housing 22. The ball and socket joint 38 is located axially outward of the right end wall 56 a distance 84 which is at least one-half the travel length t of the rack member 24. This permits movement of the rack member 24 to its left travel limit without the ball and socket joint 38 engaging the bearing 82.

The overall length L1 of the rack member 24 is established by the sum of the lengths 72, 74, 76, 78, 84 of portions of rack member 24 which are required to accommodate travel of the rack member plus the sum of the lengths 90, 92, 94, 96, 98 of other portions of the rack member. The lengths 90, 92, 94, 96, 98 of the other portions of the rack member 24 correspond to the lengths of the piston 52, end walls 54 and 56, bearing 82 and spacing of the ball and socket joints 36, 38 along the rack member to avoid engagement with ends of the rack housing 22. Thus, it will be apparent that the sum of the lengths 72, 74, 76, 78, 84 of portions of the rack member 24 required to accommodate rack travel in the prior art steering gear 20 must be at least three times the length of travel t of the rack member 24 which is defined by the distance 72 between the end rack teeth 26a, 26b.

Figure 2:
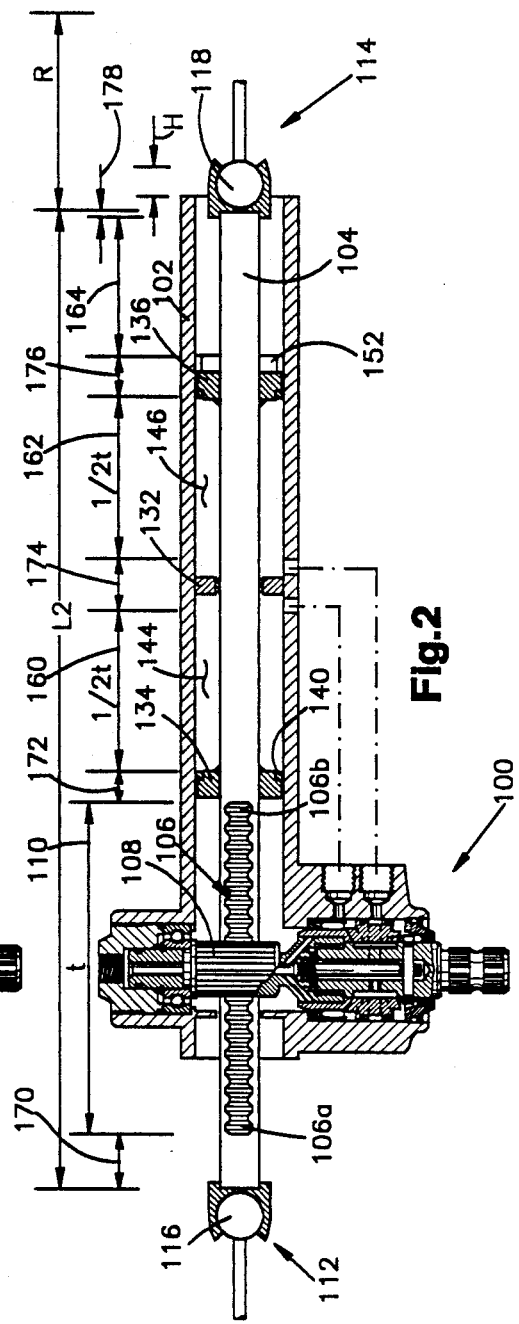
FIG. 2 is a longitudinal cross-sectional view of one embodiment of a rack and pinion steering gear of the present invention.

A steering gear 100, according to one embodiment of the present invention, is illustrated in FIG. 2. The steering gear 100 is a fluid power assist end-take-off rack and pinion type. The steering gear 100 includes a generally tubular rack housing 102 which is attachable to a vehicle. A rack member 104 is located within the housing 102 and is axially movable equidistant in either direction from an initial centered position, as illustrated in FIG. 2, to the positions illustrated in FIGS. 3 and 4.

A plurality of rack teeth 106 are formed on the rack member 104. The maximum length of travel t that the rack member 104 may traverse is equal to the maximum length of travel t of the rack member 24, described above, and is established by the distance 110 between the end rack teeth 106a, 106b. A rotatable pinion gear 108 is in meshing engagement with the rack teeth 106. A pair of tie rods 112, 114 include respective ball and socket joints 116, 118 which are attached to axially opposite ends of the rack member 104. The tie rods 112, 114 are associated with steerable wheels of the vehicle. Each of the open axial ends of the rack housing 102 are sealed by a bellows (not shown) extending between the rack housing and respective one of the ball and socket joints 116, 118.

A piston or central wall 132 is fixed to the interior of the housing 102. A movable end wall 134 is fixed to the rack member 104 at a distance 160 away from the central wall 132. The end wall 134 is movable with the rack member 104. The distance 160 is slightly greater than one half the travel length t of the rack member 104. The movable end wall 134 is located adjacent the rightmost end tooth 106b of the rack teeth 106. The movable end wall 134 carries a seal 140 and cooperates with the central wall 132 to define a variable volume working chamber 144. When pressurized fluid is directed into the working chamber 144, the end wall 134 and rack member 104 move to the left of its centered position as illustrated in FIG. 2 toward the left end limit position illustrated in FIG. 3.

When the rack member 104 moves to the left relative to the rack housing 102 from the position illustrated in FIG. 2 to the position illustrated in FIG. 3, the pinion gear 108 engages the rightmost rack tooth 106b and the second movable wall 136 is brought into close proximity to the central wall 132. The pivot joint 118 for the tie rod 114 and the right axial end of the rack member 104 is located inside of the axial end of the rack housing 102.

A movable end wall 136 is fixed to the rack member 104 on a side of the central wall 132 opposite the location of the movable end wall 134. The movable end wall 136 moves with the rack member 104. The movable end wall 136 is located a distance 162 away from the central wall 132. The distance 162 is slightly greater than one half the travel length t of the rack member 104. The movable end wall 136 and central wall 132 cooperate to define another variable volume working chamber 146. When pressurized fluid is directed into the working chamber 146, the end wall 136 and rack member 104 move to the right from the centered position of FIG. 2 toward the right travel limit position illustrated in FIG. 4.

A bearing 152 is fixed to the rack member 104 and is located axially outwardly of the movable end wall 136. The bearing 152 supports the rack member 104 for movement within and relative to the rack housing 102. The bearing 152 prevents the transmission of loads in a direction transverse to the longitudinal central axis of the rack member 104 from being transmitted to the end wall 136.

The ball and socket joint 118 of tie rod 114 is located a distance 164 away from the bearing 152. Spacing the ball and socket joint 118 away from the bearing 152 permits the tie rod 114 to articulate through an angle A1 when the ball and socket joint is located within the rack housing 102, as illustrated in FIG. 3. The distance 164 and articulation angle A1 are selected for the particular vehicle application.

As illustrated in FIG. 4, the rack member 104 is moved to the right of the centered position to its right travel limit. The pinion gear 108 engages the left end rack tooth 106a and the first movable wall 134 is located in close proximity to the fixed central wall 132. The bearing 152 has moved to the right axial end of the housing 102. The location of the bearing 152 defines the absolute minimum axial extent of the rack housing 102 that is required to support the rack member 104 for movement to its right travel limit. It will be apparent that the length of the rack housing 102 can be reduced by a distance H from the length of the rack housing 22 required in FIG. 1. Thus, a weight savings and size reduction of the modified rack member 104 and of the rack housing 102 is realized.

Fixing the movable end wall 134 to the rack member 104 assures that no rack teeth 106 move through a fluid seal. Fixing the movable end wall 134 adjacent the rack tooth 106b further advantageously permits a reduction in length of the rack member 24 by an amount approximately one-half of the travel length t of the rack member which was formerly occupied by the smooth region 60 (FIG. 1) of the rack member 24 which was required to space the last rack tooth 26b from the seal 58 in the prior art steering gear 20.

The overall length L2 of the rack member 104 is established by the sum of the lengths 110, 160, 162, 164 of portions of rack member 104 which are required to accommodate travel of the rack member plus the sum of the lengths 170, 172, 174, 176, 178 of other portions of the rack member. The lengths 170, 172, 174, 176, 178 of the other portions of the rack member 104 may be varied in length depending on the particular application and correspond to the lengths of the central wall 132, end walls 134 and 136, bearing 152 and spacing of the ball and socket joints 116, 118 along the rack member to avoid engagement with ends of the rack housing 102. The sum of the lengths 170, 172, 174, 176, 178 of the rack member 104 is substantially equal to the sum of the lengths 90, 92, 94, 96, 98 of the rack member 24. The sum of the lengths 110, 160, 162, 164 of portions of the rack member 104 required to accommodate rack travel is less than three times the length of travel t of the rack member and preferably is two and one half times the length of the travel t of the rack member.

The overall length L2 of the rack member 104 is reduced by a length R (FIG. 2) as compared to the length L1 of the rack member 24 (FIG. 1). The length R is approximately equal to one half the length of travel t of the rack member 104 in the embodiment illustrated in FIG. 2. Reducing the length of the rack member 104 also reduces the weight of the rack member and, in turn, of the steering gear 100. Thus, the steering gear 100 can be made more compact than the prior art steering gears and have a lower weight, both of which are desirable to vehicle designers. Such a steering gear 100 also permits the location of the ball and socket joints 116, 118 closer together which may be desirable to improve vehicle suspension bump steer, compliance steer, and Ackermann steering in some vehicles.

FIG. 5 illustrates an alternate embodiment of the steering gear 200 of the present invention. The steering gear 200 is of the fluid power assist end-take-off rack and pinion type. The steering gear 200 includes a rack housing 202 which is similar to the rack housing 102 illustrated in FIGS. 2-4. A rack member 204 is supported within the rack housing 202 for reciprocal axial movement relative to the rack housing 202 ad has a maximum length of travel t. The construction of the rack member 204 is similar to the rack member 104, illustrated in FIGS. 2-4 and described above, but has been modified to achieve an even shorter overall length in comparison to the length of the rack member 104.

The rack member 204 has been shortened by locating a ball and socket 218 for the right tie rod 214 adjacent the bearing 252 as close as possible. The bearing 252 supports the right axial end portion of the rack member 204. This shortens the rack member 204 in comparison to the length of the rack member 104 by approximately the distance 164 (FIG. 3).

The overall length L3 of the rack member 204 is established by the sum of the lengths 260, 262, 264 of portions of rack member 204 which are required to accommodate travel of the rack member plus the sum of the lengths 270, 272, 274, 276 of other portions of the rack member. The lengths 270, 272, 274, 276 of the other portions of the rack member 204 may be varied depending on the particular application and correspond to the lengths of the piston 232, end walls 234 and 236, bearing 252 and spacing of the ball and socket joints 216, 218 along the rack member. The sum of the lengths 260, 262, 264 of portions of the rack member 204 required to accommodate rack travel is less than two and one half times and preferably is two times the length of travel t of the rack member 204.

As illustrated in FIG. 6, the amount of articulation of the tie rod 218 is limited to the angle A2 at which the tie rod 218 contacts the inner surface of the axial end of the rack housing 202. However, it will be apparent that the housing diameter can be selected independent of rack travel or steering gear axial design constraints to provide tie rod articulation required by the particular vehicle application.

From the above description of preferred embodiments of the invention, those skilled in the art will perceive improvements, changes and modifications. Such improvements, changes and modifications within the skill of the art are intended to be covered by the appended claims.

Having described preferred embodiments of the invention, I claim:

1. A fluid power assist steering gear for steering a pair of steerable wheels of a vehicle, said steering gear comprising:
   a housing attachable to the vehicle;
   a rack member movable in said housing, said rack member having first and second axially opposite ends connectable with a respective one of a pair of ball joints associated with said steerable wheels;
   a plurality of rack teeth formed in a row on said rack member at a first axial section of said rack member corresponding in length with said row of rack teeth;
   a rotatable pinion gear in meshing engagement with said rack teeth;
   a hydraulic motor for moving said rack member to provide steering power assist, said hydraulic motor comprising:
      a piston fixed to said housing and having an axial passage through which said rack member moves; and
      first and second end wall members fixed to said rack member on opposite axial sides of said piston and movable with said rack member when pressurized fluid is directed into a space between said piston and one of said end wall members, said first end wall member corresponding in length with a second axial section of said rack member, said second end wall member corresponding in length with a third axial section of said rack member;
   a bearing fixed to said rack member and supporting said rack member for reciprocating movement in said housing and in a path having a predetermined length, said bearing corresponding in length with a fourth axial section of said rack member;
   said first axial section of said rack member being adjacent to said first end of said rack member;
   said second axial section of said rack member being adjacent to said first axial section;
   said fourth axial section of said rack member being contiguous to said third axial section;
   said second end of said rack member being contiguous to said fourth axial section;
   said rack member having a position centered on said path of movement, said second end of said rack member being receivable within said housing to locate the respective ball joint within said housing when said rack member is in said centered position; and
   said rack member having an overall length between said ends which is equal to the sum of the lengths of said first, second, third and fourth axial sections, plus the distance between said first and second end wall members, plus any length of said rack member between said first axial section and said first end, plus any length of said rack member between said first axial section and said first end wall member.

2. A fluid power assist steering gear for steering a pair of steerable wheels of a vehicle, said steering gear comprising:
   a housing attachable to the vehicle;
   a rack member movable in said housing, said rack member having first and second axially opposite ends connectable with a respective one of a pair of ball joints associated with said steerable wheels;
   a plurality of rack teeth formed in a row on said rack member at a first axial section of said rack member corresponding in length with said row of rack teeth;
   a rotatable pinion gear in meshing engagement with said rack teeth;
   a hydraulic motor for moving said rack member to provide steering power assist, said hydraulic motor comprising:
      a piston fixed to said housing and having an axial passage through which said rack member moves; and
      first and second end wall members fixed to said rack member on opposite axial sides of said piston and movable with said rack member when pressurized fluid is directed into a space between said piston and one of said end wall members, said first end wall member corresponding in length with a second axial section of said rack member, said second end wall member corresponding in length with a third axial section of said rack member;
   a bearing fixed to said rack member and supporting said rack member for reciprocating movement in said housing and in a path having a predetermined length, said bearing corresponding in length with a fourth axial section of said rack member;
   said first axial section of said rack member being adjacent to said first end of said rack member;
   said second axial section of said rack member being adjacent to said first axial section;
   said fourth axial section of said rack member being contiguous to said third axial section;
   said second end of said rack member being contiguous to said fourth axial section; and
   said rack member having a position centered on said path of movement, said second end of said rack member being receivable within said housing to locate the respective ball joint within said housing when said rack member is in said centered position.

3. A fluid power assist steering gear for steering a pair of steerable wheels of a vehicle, said steering gear comprising:
- a housing attachable to the vehicle;
- a rack member movable in said housing, said rack member having first and second axially opposite ends connectable with a respective one of a pair of ball joints associated with said steerable wheels;
- a plurality of rack teeth formed in a row on said rack member at a first axial section of said rack member corresponding in length with said row of rack teeth;
- a rotatable pinion gear in meshing engagement with said rack teeth;
- a hydraulic motor for moving said rack member to provide steering power assist, said hydraulic motor comprising:
  - a piston fixed to said housing and having an axial passage through which said rack member moves; and
  - first and second end wall members fixed to said rack member on opposite axial sides of said piston and movable with said rack member when pressurized fluid is directed into a space between said piston and one of said end wall members, said first end wall member corresponding in length with a second axial section of said rack member, said second end wall member corresponding in length with a third axial section of said rack member;
- a bearing fixed to said rack member and supporting said rack member for reciprocating movement in said housing and in a path having a predetermined length, said bearing corresponding in length with a fourth axial section of said rack member;
- said first axial section of said rack member being adjacent to said first end of said rack member;
- said second axial section of said rack member being adjacent to said first axial section;
- said fourth axial section of said rack member being contiguous to said third axial section;
- said second end of said rack member being contiguous to said fourth axial section; and
- said rack member having an overall length between said ends which is equal to the sum of the lengths of said first, second, third and fourth axial sections, plus the distance between said first and second end wall members, plus any length of said rack member between said first axial section and said first end, plus any length of said rack member between said first axial section and said first end wall member plus any length.

* * * * *